June 15, 1971  F. E. TURNER  3,584,352
PIPE CLAMP WITH BRIDGE BOLT
Filed Oct. 27, 1969
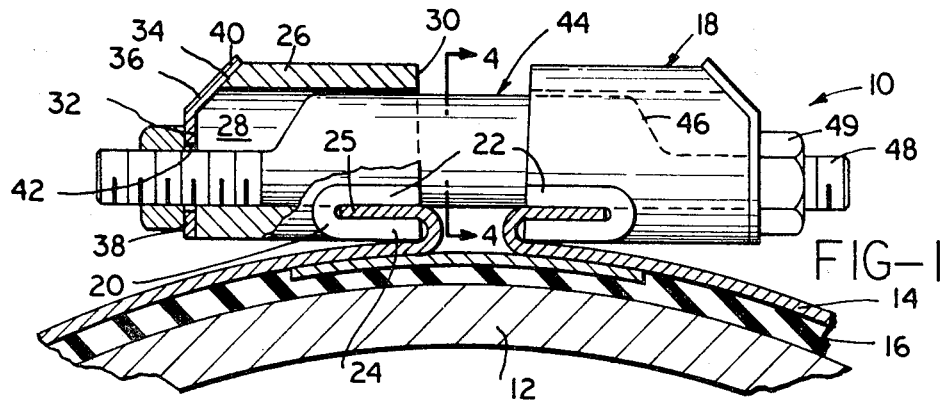
FIG-1
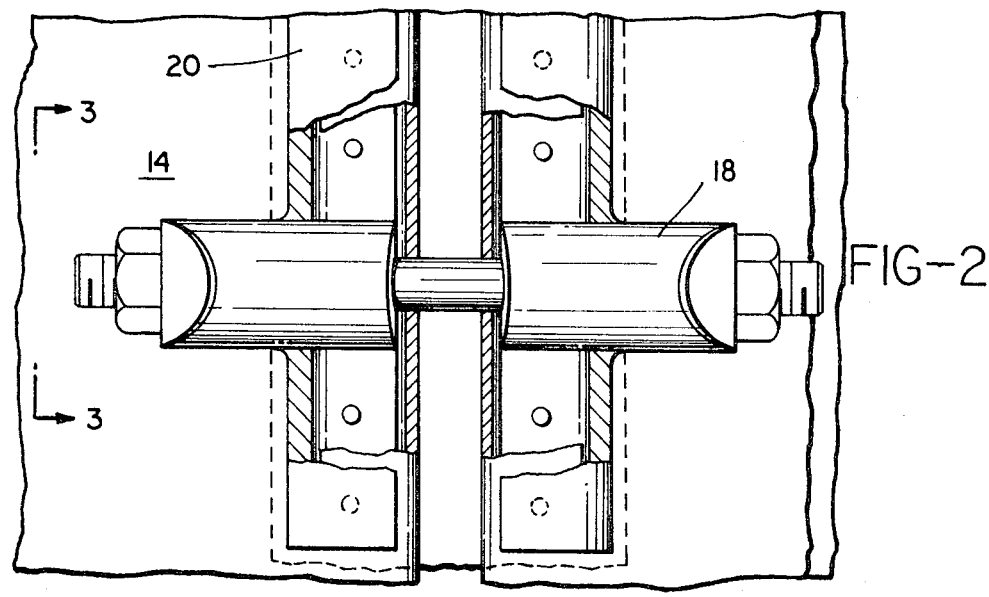
FIG-2
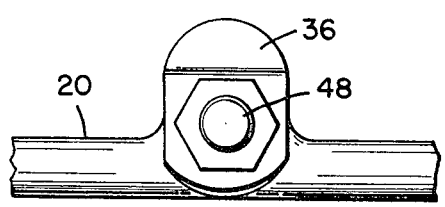
FIG-3
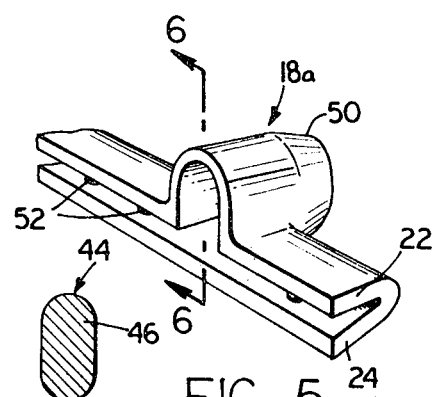
FIG-5
FIG-4
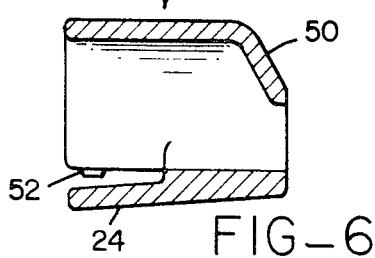
FIG-6
INVENTOR.
FRANK E. TURNER
BY
Owen, Wickersham & Erickson
ATTORNEYS United States Patent Office 3,584,352
Patented June 15, 1971

3,584,352
PIPE CLAMP WITH BRIDGE BOLT
Frank E. Turner, 3 Greenfield Court,
San Mateo, Calif. 94403
Filed Oct. 27, 1969, Ser. No. 869,724
Int. Cl. F16l *19/00*
U.S. Cl. 24—279    7 Claims

ABSTRACT OF THE DISCLOSURE

A pipe clamp comprised of a pair of rigid lugs fixed to the ends of flexible band adapted to bend around a pipe. The lugs are shaped internally to receive one or more bolts each of which has a central section with an enlarged non-circular cross section providing increased strength to resist bending and having integral threaded end portions.

---

This invention relates to pipe clamps and particularly to such clamps which are used to repair cracks or breaks and thereby prevent leaks in fluid conduits.

Such clamps are generally comprised of a flexible sheet metal band that fits around the pipe and holds an elastomeric gasket over the crack or break in the pipe. Rigid lugs are fixed to the ends of the metal band, and heretofore these were connected by and drawn together by conventional bolts and nuts. A problem which has long challenged the makers of pipe clamps has been the fact that, upon tightening the bolts to draw the lugs together and thereby increase the pressure of the band on the gasket, the lugs tended to roll toward each other. This resulted in bent bolts and a loss of band tension and hence a loss of the gasket pressure necessary to prevent leakage. Various lug designs for pipe clamps have been designed to solve this problem, and one fairly effective solution has been the use of stabilizing fingers on each lug which extend across and engage the mating lug. These fingers prevent the lugs from tipping as the bolts are tightened and thus reduce bolt bending. However, one disadvantage with such finger type lugs is that they are fairly complicated castings, require more metal and therefore are more expensive.

A general object of the present invention is to provide an improved pipe clamp that solves the aforesaid bolt bending problem without the need for fingers and which is thus easier to manufacture and less expensive.

More specifically, another object of my invention is to provide a clamp with lugs that are relatively easy to cast and use a minimum amount of metal compared with lugs having stabilizing fingers.

Yet another object of the present invention is to provide a pipe clamp that can supply adequate band pressure even when the lugs are relatively far apart thereby making it usable on a wider range of pipe sizes.

Another object of my invention is to provide a pipe clamp of the flexible band type which requires fewer bolts to pull the lugs on the ends of the band together in tightening the band on a pipe, thereby making the clamp easier and quicker to install.

Still another object of my invention is to provide a bolt for a pipe clamp having a relatively high degree of bending strength.

The aforesaid objects are achieved in accordance with the principles of my invention by a pipe clamp comprised of a flexible band adapted to fit around the pipe being repaired with a pair of rigid lugs fixed to the ends of the band. The lugs have bar-like jaw portions for gripping the band and integral boss portions that retain the tightening bolts for drawing the lugs together. Each boss portion is hollow by virtue of a cavity having a non-circular cross-section which accomodates and guides a central bolt portion having a similar non-circular cross-section. This central bolt portion which can thus move axialy within the lug boss portions but cannot rotate when the bolts are tightened is thus enlarged and shaped to afford increased bending strength for the bolts and makes possible in-- creased gasket pressure on the pipe surface.

Other objects, advantages and features of the present invention will become apparent from the following detailed description presented with the accompanying drawing, in which:

FIG. 1 is a fragmentary view in elevation and in section showing a pipe clamp embodying the principles of the present invention;

FIG. 2 is a top view with portions in section of the clamp shown in FIG. 1;

FIG. 3 is a view in section taken along line 3—3 of FIG. 2;

FIG. 4 is a view in section taken along line 4—4 of FIG. 1;

FIG. 5 is a view in perspective of a single lug for a pipe clamp according to the present invention; and FIG. 6 is a view in elevation and in section taken along the line 6—6 of FIG. 5.

Referring to FIG. 1, there is shown a pipe clamp 10, embodying the principles of the present invention as it appears when attached around a pipe 12 such as concrete, ceramic or metal pipe in a water system for the purpose of preventing leakage from a break or crack therein. The clamp is comprised of a flexible metal band 14 that fits around the pipe and is drawn tightly against an elastomeric sheet gasket 16 placed between the band and the outer pipe surface to seal the leak. Connected to each end of the band is a rigid lug 18 preferably cast from a suitable metal such as malleable iron or bronze. In the present invention the lugs are preferably identical and thus interchangeable, and can be made from the same mold. As seen in FIG. 2, each lug has an elongated bar-like base member 20 with a constant width and upper and lower jaw portions 22 and 24 that grip one end 25 of the band along the full length of the lug. Integral with the base member 20 and extending rearwardly and upwardly therefrom is a hollow boss portion 26 through which extends a central bore 28 whose axis is generally perpendicular to the longitudinal axis of the base member 20. In cross-section the base of each lug is non-circular and preferably generally oval shaped with its longest dimension being vertical to the plane of the base member and substantially greater than its width. The inner face 30 of each lug is substantially vertical to the axis of the boss 26 and also preferably flush with the inner edges of the base member jaw portions 22 and 24. At its other end the boss portion of each lug extends beyond the rear edge of the base member and has a planar end surface 32 surrounding the bore 28 which is perpendicular to its axis. The upper corner of each boss portion may be provided with a beveled surface 34 which removes unnecessary metal and eliminates a potentially injurious edge on the lug.

Adapted to fit over the outer end of each boss portion is a washer 36 having a uniform thickness and preferably made of a tough sheet metal material. As shown best in FIG. 1 each washer has a lower portion 38 that is generally vertical and fits flush against the end surface of the boss member and an upper portion 40 that is bent from the lower portion to lie flush against the beveled portion. The bent upper portion prevents the washer from turning as the bolts are tightened. The lower portion of each washer is provided with a circular opening 42 through which the end of a bolt 44 extends when the clamp is assembled.

With the flexible band located around the pipe the lug members are separated by a gap and their aligned boss portions 26 are bridged by the bolt member 44. The latter, which is an important component of my clamp, is unlike conventional clamp bolts and has an enlarged non-cylindrical central or bridge portion 46 with threaded portions 48 extending from the opposite ends thereof. The cross section of the bolt bridge section is slightly smaller than the cross section of the bore 28 in each lug boss member, so that the lugs can slide on the bolt member central portion 46 as they are drawn together during tightening of the clamp. The threaded ends 48 of the bolt member are of a size which enables them to extend through the hole 42 in each washer 36 located at the end of each lug boss position. A nut 49 is threaded to each end portion 48 and when tightened against the washer 36, causes the lugs to move closer together.

As readily apparent from the drawing, the central portion 46 of the bolt 44 is enlarged from the normal cylindrical configuration essentially in a vertical direction or in a plane perpendicular to the plane of the lug base member 20. Since the forces created on the bolt by the lugs during the tightening of the nuts 49 are in this same vertical direction the enlarged central portion affords substantially increased bending strength. The bolts may be manufactured in different ways with almost equal effectiveness. For example, they may be cast as an integral member with the central portion 46 being substantially oval as in FIG. 4. Or, the bolts may be made by joining, as by welding, an additional cylindrical upper portion to a conventional cylindrical bolt or stud having threaded end portions. If desired, bolts may also be used having a fixed head at one end and a threaded end portion at the other end. However, having the bolts threaded at both ends allows for a greater clamp take-up range and distributes the bending load equally to both ends of the bolt.

A somewhat modified form of lug 18a which utilizes the principles of the present invention is shown in FIGS. 5 and 6. Here, the end washers 36 are not used and each boss portion on the lug is cast with an integral end portion 50 having a circular opening slightly larger in size than the threaded end of a bolt 44. The function of this lug is the same as the lugs 18, the only difference being that the bolts with threaded portions at both ends must be used and they cannot be inserted from the outer ends of the boss portions when the clamp is installed. As shown in FIG. 6, the lugs 18 and 18a are preferably cast with their jaw portions 22 and 24 in the open position, and later they are coined together in a press to grip the end 25 of the band. One of the jaw portions is provided with short protuberances 52 which register with slightly larger recesses in the opposite jaw (not shown). This combination of protuberances and recesses is particularly effective in helping the jaws to maintain a firm grip on the band end portion, although it should be understood that other band gripping means could be used within the scope of the invention.

As seen in FIG. 1 and 5, the bore 28 of each boss portion 26 cuts through the upper jaw member but not in the lower jaw member. Thus the lower side of the bolt member 44 is essentially adjacent to the band end portion 25. This greatly reduces the moment arm of forces caused by the nuts on the bolts and resistance from the ends of the band.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A pipe clamp comprising:
  a flexible sheet metal band adapted to extend around a pipe being repaired and adjacent an elastomeric gasket covering a leak in the pipe;
  a pair of rigid lugs each fixed to one end of said band, each said lug comprising an elongated base portion adapted to extend substantially parallel to the axis of the pipe, a boss portion on said base portion having a bore with a non-circular cross-section whose axis is perpendicular to a plane through the axis of the pipe, and a bridge bolt supported in said lugs, each said bolt having an enlarged non-circular central portion with a cross-section that fits within the cross-section of said bore to provide a loose sliding clearance and a threaded end portion extending axially from one end of said central portion; and
  a tightening nut threadedly attached to said end portion of said bridge bolt for bearing on a said boss portion to force said lugs together and thereby tighten said band around the pipe.

2. The pipe clamps as described in claim 1 wherein each said lug has an integral end portion with an opening smaller than said bore for an end portion of said bolt and providing an outer end face against which a said nut can bear.

3. The pipe clamp as described in claim 1 wherein said non-circular bore in each said lug extends completely through each said boss portion and including a removable washer located adjacent the outer end of each said boss portion, said washer having an opening large enough to receive the threaded end portion of a said bolt and thereby provide a bearing surface for a tightening nut.

4. The pipe clamp as described in claim 3 wherein the outer, upper edge of each boss portion is beveled at an angle and each said washer is bent at the same angle to form upper and lower portions, the lower portion having said opening for the threaded end of a said bolt.

5. The pipe clamp as described in claim 1 wherein said base portion of each said lug is comprised of a pair of integral upper and lower gripping jaw portions, said bolt member extending through said upper jaw portions.

6. For use in a pipe clamp of the flexible band type, a bolt having an enlarged central portion with a non-circular cross-section, threaded cylindrical portions extending from opposite ends of said central portion.

7. The bolt as described in claim 6 wherein said central portion has a substantially rectangular cross-section with rounded ends and said threaded portions extend from the lower end of said cross-section.

References Cited
UNITED STATES PATENTS

| 734,512 | 7/1903 | Christopher | 24—280UX |
| 1,629,246 | 5/1927 | Arrington | 24—280 |
| 2,599,882 | 6/1952 | Adams | 24—279 |
| 3,254,387 | 6/1966 | Smith | 24—279 |

DONALD A. GRIFFIN, Primary Examiner

U.S. Cl. X.R.

138—99